(Model.)
E. DOBELL.
Button or Stud.
No. 229,240.  Patented June 29, 1880.

Fig. 11 / Fig. 12 

Witnesses:
Pennington Halsted
Robert Lynch
Inventor.
Ebenezer Dobell
by John J. Halsted

UNITED STATES PATENT OFFICE.

EBENEZER DOBELL, OF HASTINGS, GREAT BRITAIN.

BUTTON OR STUD.

SPECIFICATION forming part of Letters Patent No. 229,240, dated June 29, 1880.

Application filed April 14, 1880. (Model.) Patented in England December 8, 1879.

*To all whom it may concern:*

Be it known that I, EBENEZER DOBELL, of Hastings, in the county of Sussex, England, jeweler, have invented a new and useful Improvement in Solitaires and other Dress-Studs, (for which I have obtained a patent in Great Britain, No. 5,020, dated December 8, 1879,) and of which the following is a specification.

The object of my invention is that the practical length of the shank may be varied at will, and the shank be self-locked to either of its adjusted positions without removing the shank; and the invention consists in a specific construction, and a modification thereof, hereinafter fully set forth; but that the invention may be the better understood, I will, by the aid of the accompanying drawings, proceed more fully to describe the same in detail.

Figure 2:
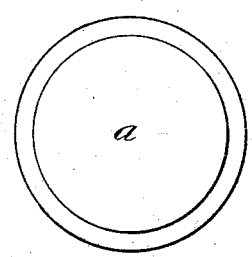
Figure 4:
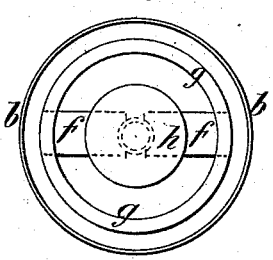
Figure 6:
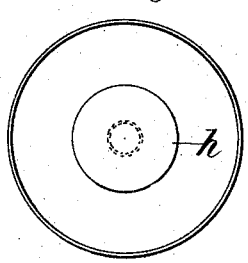
Figure 9:
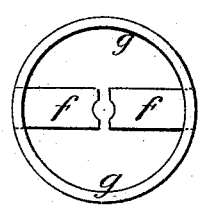
Figure 1:
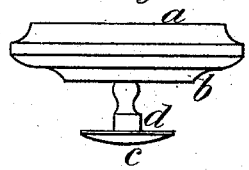
Figure 5:
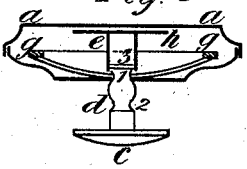
Figure 7:
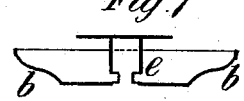
Figure 10:
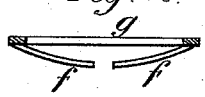
Figure 3:
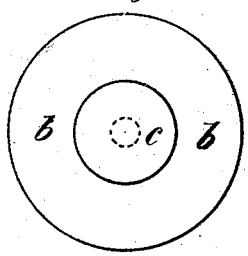
Figure 5:
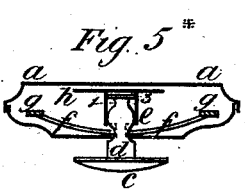
Figure 8:
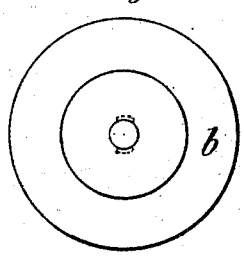

Figure 1 shows an external side or edge view, Fig. 2 an upper-side view, Fig. 3 an under-side view, and Figs. 4 and 5 transverse and vertical sections, respectively, of an arrangement of parts according to my invention. Fig. 5* shows, by another section, the parts in a different position from that indicated by Fig. 5. Figs. 6, 7, and 8 show a plan or inside view, a section, and an under-side view of the back of the front; Figs. 9 and 10, an upper-side view and a section of the internal spring and its arms, and Figs. 11 and 12 an upper-side view and a side view of the stem and back.

The figures are all drawn to an enlarged scale, in order to the operation of the parts being the better understood, and in each of them the same letters are used to indicate corresponding parts.

*a* represents the front of a solitaire or other dress-stud, *b* the back part of such front portion, and *c* is the back of the solitaire or other dress-stud, or that part which in use is passed through the button hole or holes of the portion of dress to which it is applied, and it rests on the inside of such portion to hold the solitaire or other dress-stud in position. *d* is the stem connecting this back to the front, and this stem *d*, it will be seen, is fixed at one end to the back *c*, while the outer end thereof is passed through the back *b* of the front into a cylinder, *e*, affixed to the back *b* of the front, and which cylinder acts as a guide to the stem *d* in its to-and-fro movement.

The stem *d* is recessed or formed with necks at 1 and 2, and between the recesses or necks 1 and 2 it is enlarged. The object of these recesses or necks is to receive the ends of arms or plates *f f*, forming projections from and parts of the elastic ring *g*. This ring acts as a spring, by its elasticity to cause the inner ends of the arms or plates *f f* to bear against the stem *d* with an elastic pressure sufficient to hold the stem, with the ends of the arms or plates *f f* in either of its necks, 1 or 2, and yet admit of that stem being slid telescopically in the cylinder *e* under slight pressure, so that either one or the other of its necks, 1 or 2, may receive the inner ends of such arms or plates.

3 is a cap to the inner end of the stem *d*, to prevent it from being drawn too far outward from the cylinder *e*. *h* is a cover or guard to the end of the cylinder *e*, to act as a guard and prevent the inner end, 3, of the stem *d* from being pressed too far to act against the inside of the front of the solitaire or other dress-stud.

The cylinder *e* is perforated on its opposite sides to admit of the passage of the inner ends of the arms or plates *f f* to act on the stem *d*.

Figure 13:
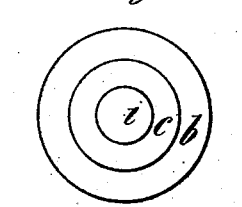
Figure 14:
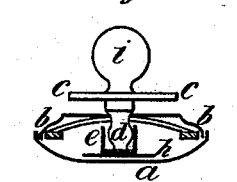
Figure 15:
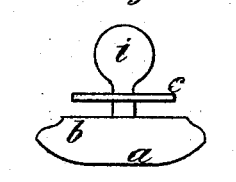

Fig. 13 shows by plan view, Fig. 14 by section, and Fig. 15 by elevation, a modification of my improvements to an enlarged scale, adapted particularly to shirt and such like dress-studs. In this case, in place of the part *a b* carrying the holding-spring *f g*, forming the front of the stud, that part is placed at the back, with the part *c* either in front of two thicknesses held together with a gold bead, a pearl, a gem, a portion of coral or other ornament, *i*, on or attached to it; or the ornament applied on the plate *c* may alone be passed through the outer of the two portions of dress, to be alone visible externally, and the plate *c* will then be held between the two thicknesses of dress to be held together.

Supposing such studs to be applied to shirt-fronts formed in two parts, studs such as now described may be first applied through the button-holes of the back portion of such shirt-front before the shirt is put on, and when the shirt has been put on the front part will be held by the passing through the button-holes thereof alone of the part *i*, the plate *c* in such case remaining between the front and back parts of the shirt-front.

Figure 16:
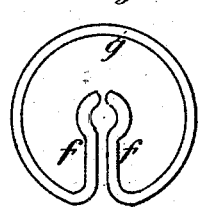

Fig. 16 shows a slight modification of spring and arms *g* and *f*, in which the arms *ff* are obtained by the bending inward of the ends of the spring *g;* but it will be evident that many variations in form may be obtained in the application of the required elastic pressure to the stems of such studs.

Having thus described my invention and means which I adopt in carrying the same into effect, I would have it understood that I do not confine myself to the precise arrangements of parts as shown and described, as the same may be varied without departing from the peculiar character of my invention; but

What I do claim is—

1. The shank or stem *d*, provided with the grooves or recesses 1 2, in combination with the spring arms or plates *f* of the stud, the combination permitting the practical lengthening of the shank and the locking of the same to either of its adjusted positions, substantially as shown and described.

2. In combination with the adjustable stem *d*, having the grooves or recesses 1 2, and with the spring plates or arms *f* of the stud, the plate *c*, and the supplemental head or part *i*, as and for the purposes described.

In testimony whereof I have signed my name to this specification in the presence of two subscribing witnesses.

EBENEZER DOBELL.

Witnesses:
WILLIAM BROOKES,
ALFRED GEORGE BROOKES.